US007869903B2

(12) United States Patent
Turner et al.

(10) Patent No.: US 7,869,903 B2
(45) Date of Patent: Jan. 11, 2011

(54) INTERACTIVE ADJUSTABLE MEDIA BED PROVIDING SLEEP DIAGNOSTICS

(75) Inventors: Jason Turner, Joplin, MO (US); Niels S. Mossbeck, Carthage, MO (US); Andy Schembs, Des Moines, IA (US); Ryan Chacon, Carthage, MO (US); Mark A. Quinn, Joplin, MO (US); Thomas W. Wells, Joplin, MO (US)

(73) Assignee: L & P Property Management Company, South Gate, CA (US)

( * ) Notice: Subject to any disclaimer, the term of this patent is extended or adjusted under 35 U.S.C. 154(b) by 45 days.

(21) Appl. No.: 12/348,569

(22) Filed: Jan. 5, 2009

(65) Prior Publication Data

US 2009/0177327 A1 Jul. 9, 2009

Related U.S. Application Data

(60) Provisional application No. 61/018,805, filed on Jan. 3, 2008.

(51) Int. Cl.
*G05B 13/02* (2006.01)
*A47B 7/02* (2006.01)

(52) U.S. Cl. ................................ 700/275; 5/2.1; 5/616; 600/300; 600/595

(58) Field of Classification Search ................. 600/300, 600/301; 340/575; 5/658; 700/275, 300–302
See application file for complete search history.

(56) References Cited

U.S. PATENT DOCUMENTS 2,789,158 A * 4/1957 Livingston .................. 348/836
3,680,936 A * 8/1972 Backhaus ................... 312/7.1
4,146,885 A * 3/1979 Lawson, Jr. ................. 600/534
4,320,766 A 3/1982 Alihanka et al.
5,054,139 A * 10/1991 Jones ............................ 5/2.1
5,062,169 A 11/1991 Kennedy et al.
5,479,939 A * 1/1996 Ogino ........................ 600/595
5,969,488 A 10/1999 Fromson
5,989,193 A 11/1999 Sullivan
6,468,234 B1 10/2002 Van Der Loos et al.
6,485,441 B2 11/2002 Woodward
6,585,328 B1 7/2003 Oexman et al.

(Continued)

OTHER PUBLICATIONS

"Time for Bed" in Sound and Vision, Mar. 5, 2005, No. 21, cover and p. 37.*

(Continued)

*Primary Examiner*—Albert DeCady
*Assistant Examiner*—Dave Robertson
(74) *Attorney, Agent, or Firm*—Shook, Hardy & Bacon LLP

(57) ABSTRACT

An bedding apparatus is provided that allows a user the ability to control a bedroom environment using one selectable control. The apparatus includes an adjustable bedding unit and a computing unit coupled to the adjustable bedding unit. A number of controllable electronic appliances, having an effect on the bedroom environment, are electrically coupled to the computing unit. These electronic appliances are capable of being controlled by the computing unit. A user interface control unit is coupled to the computing unit. The user interface presents the user with a number of user-selectable settings that cause an adjustment in the position of the adjustable bed and at least one of the electronic appliances.

20 Claims, 10 Drawing Sheets

U.S. PATENT DOCUMENTS

| | | | | |
|---|---|---|---|---|
| 6,821,258 | B2 | 11/2004 | Reed et al. | |
| 7,001,334 | B2 * | 2/2006 | Reed et al. | 600/300 |
| 7,007,327 | B2 * | 3/2006 | Ogawa et al. | 5/609 |
| 7,396,331 | B2 * | 7/2008 | Mack et al. | 600/300 |
| 2004/0103475 | A1 | 6/2004 | Ogawa et al. | |
| 2004/0156517 | A1 * | 8/2004 | Schmidt et al. | 381/334 |
| 2004/0168257 | A1 | 9/2004 | Torrez | |
| 2005/0091739 | A1 * | 5/2005 | Lerma | 4/541.1 |
| 2006/0047217 | A1 * | 3/2006 | Mirtalebi et al. | 600/534 |
| 2007/0120689 | A1 | 5/2007 | Zerhusen et al. | |
| 2007/0161917 | A1 * | 7/2007 | Ozaki et al. | 600/529 |
| 2008/0095395 | A1 * | 4/2008 | Pieklik et al. | 381/387 |
| 2008/0264426 | A1 * | 10/2008 | Walker | 128/848 |
| 2008/0275314 | A1 * | 11/2008 | Mack et al. | 600/301 |
| 2009/0318776 | A1 * | 12/2009 | Toda et al. | 600/301 |

OTHER PUBLICATIONS

“Ruf-Cinema” at Dexterton.com, online as of Jan. 2007 [retrieved Aug. 12, 2010] Retrieved from the Internet <url:http://web.archive.org/web/20070101225019/http://www.dexterton.com/dic__furniture/ruf/cinema.html>, 3 pages.*

“Sonic Bed” at SonicBedLondon, online as of Oct. 2006 [retrieved Aug. 12, 2010] Retrieved from Internet <url:http://web.archive.org/web/20061023072539/www.musicforbodies.net/wiki/SonicBedLondon>, 3 pages.*

* cited by examiner

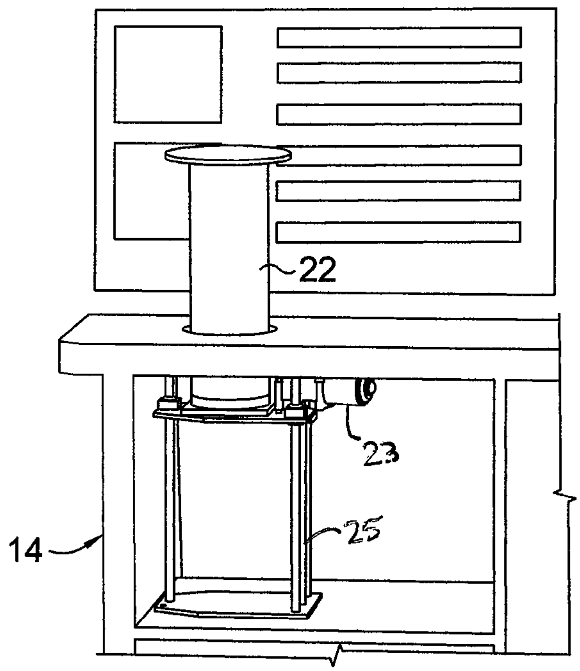
FIG. 5.
FIG. 7.
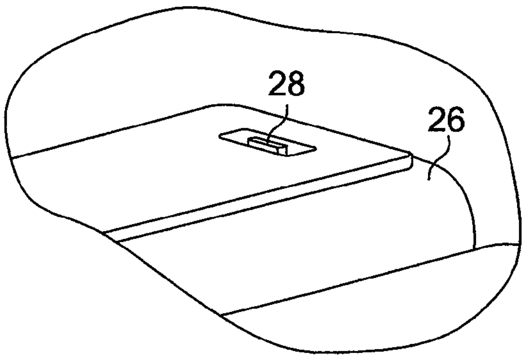
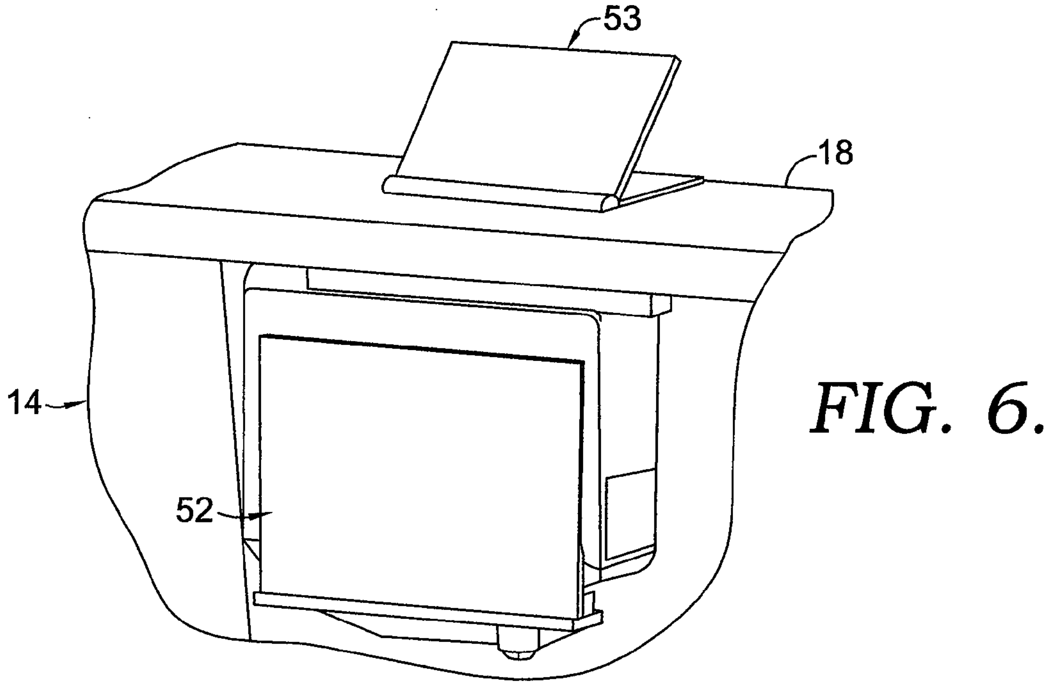
FIG. 6.

INTERACTIVE ADJUSTABLE MEDIA BED PROVIDING SLEEP DIAGNOSTICS

CROSS-REFERENCE TO RELATED APPLICATIONS

This application claims priority to U.S. Provisional application No. 61/018,805, filed Jan. 3, 2008.

STATEMENT REGARDING FEDERALLY SPONSORED RESEARCH OR DEVELOPMENT

Not applicable.

BACKGROUND OF THE INVENTION

One of the most-important aspects in providing a healthy lifestyle is achieving a good night's sleep. Over the years, many people have tried to improve the quality of sleep. It is not easy to quantify the sleep one has achieved using the beds available today. Instead, a more common answer to the question, "How did you sleep last night?" is a general answer, such as "Fine." It would be beneficial to more accurately measure the quantity and quality of sleep one is achieving. The user of the bed, or others, could then use the data to measure improvements in sleep as different approaches to improving sleep are attempted.

It would also be beneficial to interact with the bed in a more meaningful way. Today's beds offer consumers only limited opportunities to customize the bed and have it interact with their environment in some way. Consumers are now accustomed to using technology in their lives. It would be beneficial to use technology to provide consumers a way to tie the bed into other aspects of their environment.

BRIEF DESCRIPTION OF THE SEVERAL VIEWS OF THE DRAWINGS

The present invention is described in detail below with reference to the attached drawing figures, wherein:

FIG. 5 is a partial view of the rear cavity and shows the user interface displayed on a wall in front of the bed;

FIG. 6 is a partial view of the rear cavity, showing the projector and mirror;

FIG. 7 is a partial enlarged view showing a media docking station;

DETAILED DESCRIPTION

Figure 1:
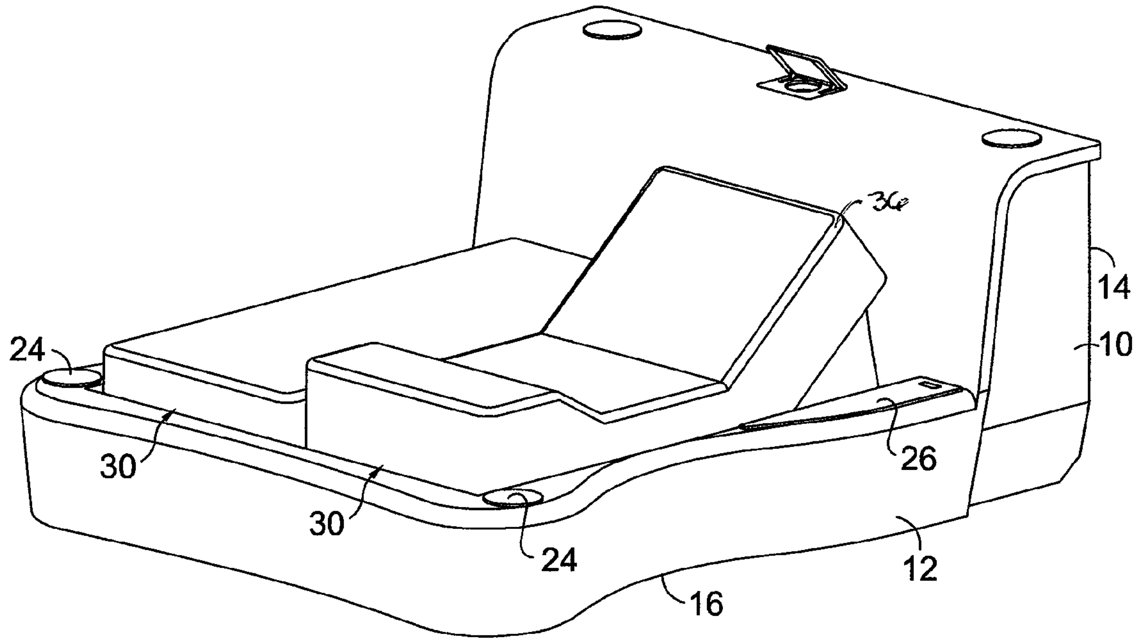
FIG. 1 shows the bed with one unit in a raised position and the speakers retracted.

FIG. 1 shows a new bed design incorporating a number of new design features. The bed 10 has a frame 12 designed to provide a structural base to the bed. The frame 12 can be made of wood or other materials as those of skill in the furniture arts would know. The frame 12 defines a rear cavity 14 and an under cavity 16, the importance of which is further described below.

Figure 2:
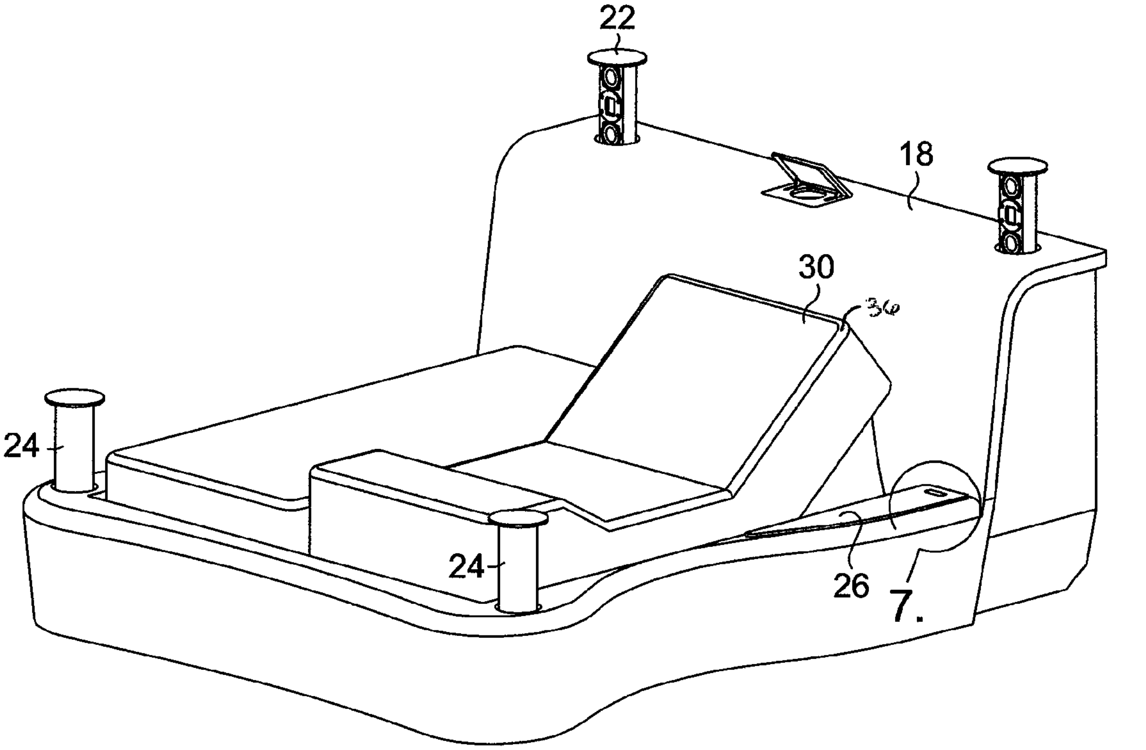
FIG. 2 shows the bed with the speakers extended.

The rear cavity 14 is located directly behind the headboard 18. The headboard 18 is designed to hide the rear cavity 14. The rear cavity 14 is equipped with support racks 20 (FIG. 3) that provide support for a number of control components for the bed. The headboard 18 is also designed to support a pair of audio speakers 22 in a retractable fashion. In other words, the speakers 22 are mounted within the headboard 18 such that they can be retracted within the rear cavity 14 and be generally hidden from view when not in use. In a similar fashion, the frame 12 is designed to provide an audio speaker cavity around the foot area of the bed. These speaker cavities are used to retractably mount a pair of audio speakers 24 (FIGS. 1 and 2) to the bed in the foot area of the bed. When not in use, the speakers can be retracted such that they are generally hidden from view when not in use. The speakers 22 and 24 can be mounted, for example, to a frame that is extendable and retractable using a linear drive motor or other mechanical device. As best seen in FIG. 5, each speaker 22, 24 has an associated motor 23 that can extend and retract the speaker 22, 24 from an into a frame 25.

Figure 9:
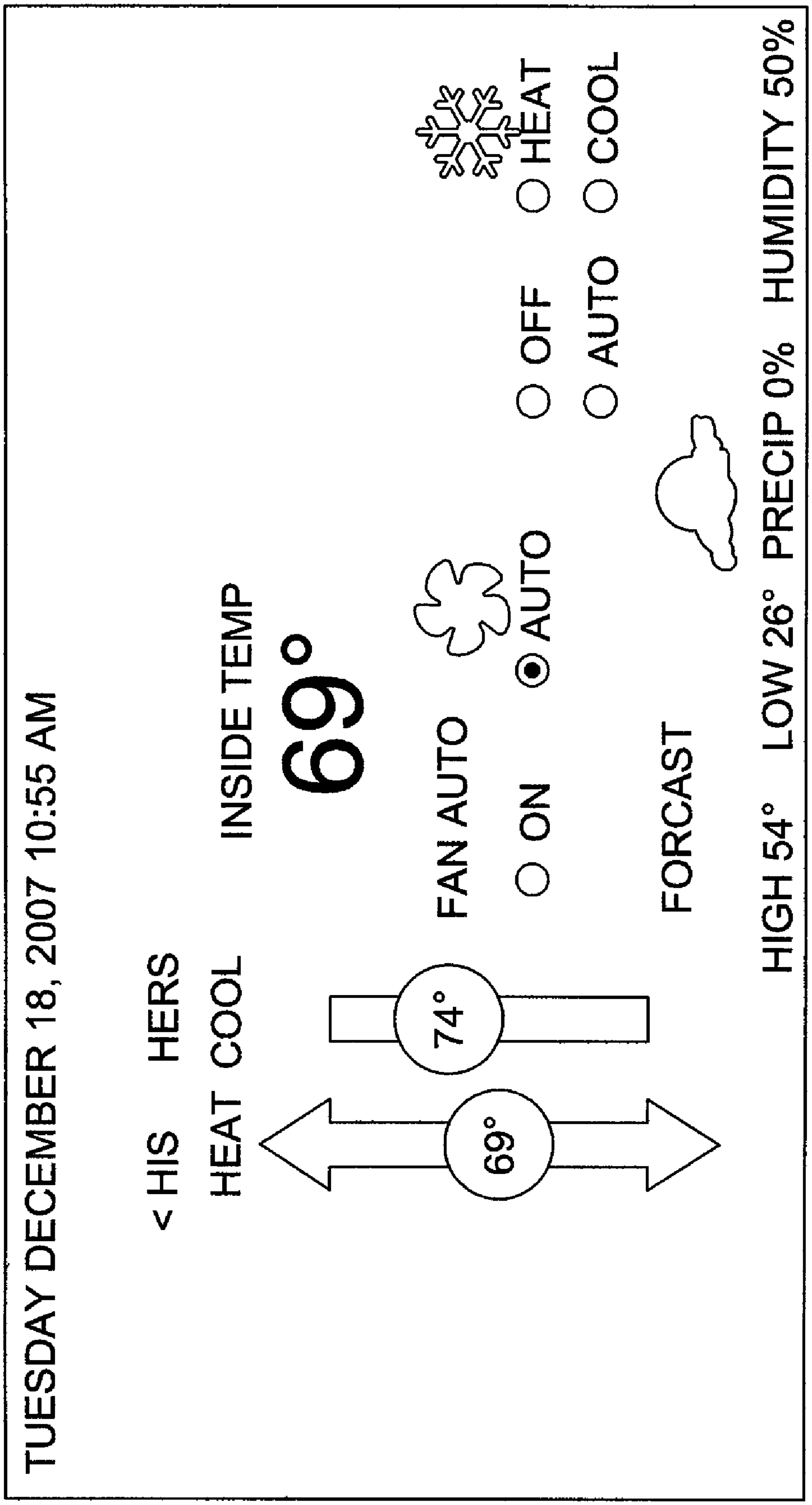
FIG. 9 a view of a temperature adjustment user interface for use with the bed.

The frame 12 is also designed with a pair of integrated end table shelves 26 (FIG. 9). In a preferred embodiment, an audio player docking station 28 is provided in at least one of the end table shelves 26. In addition to the speakers 22 and 24, a sub-woofer speaker is located in the under cavity 16, pointed in the direction of the headboard 18.

Figure 4:
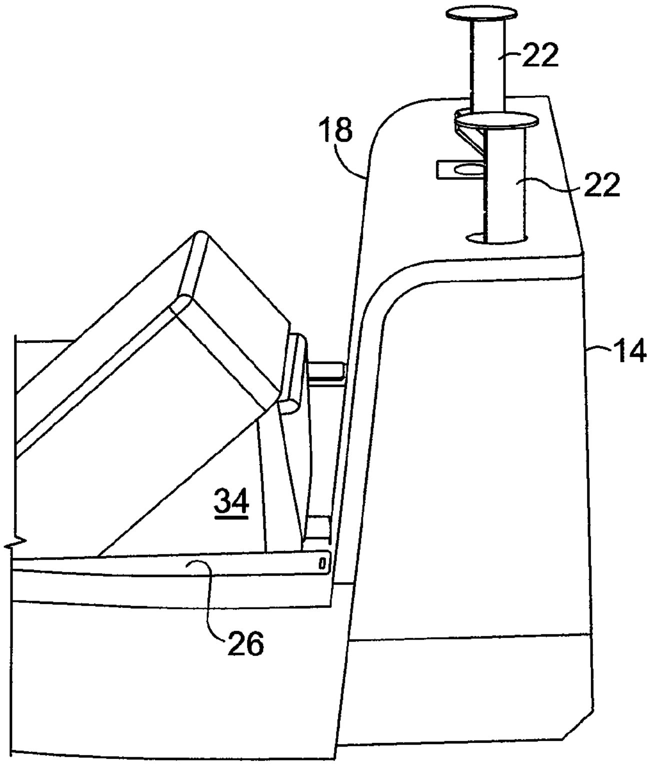
FIG. 4 is a view of a portion of the bed near the headboard, showing the shroud.

Preferably, a pair of adjustable bed units 30 are coupled to the frame 12. It should be understood that only one adjustable bed unit 30 could be used with the bed 10. In the preferred embodiment, a pair of twin adjustable beds 30 are provided. Each bed unit 30 is individually adjustable, to provide a "his" and "hers" style. The bed units 30 are adjustable to a number of different positions. For example, the head of the bed can be raised, as can the area of the bed adjacent the knee area of the user. These adjustable beds are known generally to those in the bedding field. In a preferred embodiment, as best seen in FIG. 4, the frames have an elastic fabric shroud 34 that covers any open area as the head of the bed is raised. The shroud 34 operates to protect users of the bed 10 from access to the mechanics of the bed units 30.

Each bed unit 30 preferably has a heating and cooling pad 36 installed over the mattress of the bed. Each pad 36 is coupled to a control unit housed within the rear cavity 14. The control unit can be held by the support racks 20. This allows the surface temperature of each bed unit to be individually controlled. The pad 36 is installed directly over the mattress of the bed unit 30 and has a number of fluid chambers running through it. The control unit adjusts the temperature of the water flowing through the chambers to adjust the temperature of the mattress. As one example, a mattress pad known as the ChiliPad™ marketed and sold by T2 International of Mooresville, N.C. can be used as the pad 36. An integrated heating and cooling unit is also within the scope of the present invention. Such an integrated unit replaces the pad 36 and integrates it directly into the mattress of the bedding unit 30.

The mattress of each bed unit 30 is preferable made up of three layers. The first layer 38 (FIG. 14) is made from small spring coils located on wood slats. This first layer is the foundation. An innerspring mattress 40 is located directly above the foundation. The top layer 42 is preferably a foam pad on top of which is placed the cooling pad 36. The innerspring mattress and the foam pad are both commonly used in bedding today. Further, while a particular layer construction is described, it should be understood that other mattress constructions can be used with the bed 10. Each mattress unit is also preferably provided with a massage assembly. The massage assemblies are preferably individually controllable and can be one of the many massage assemblies that are currently used in the bedding industry.

Figure 14:
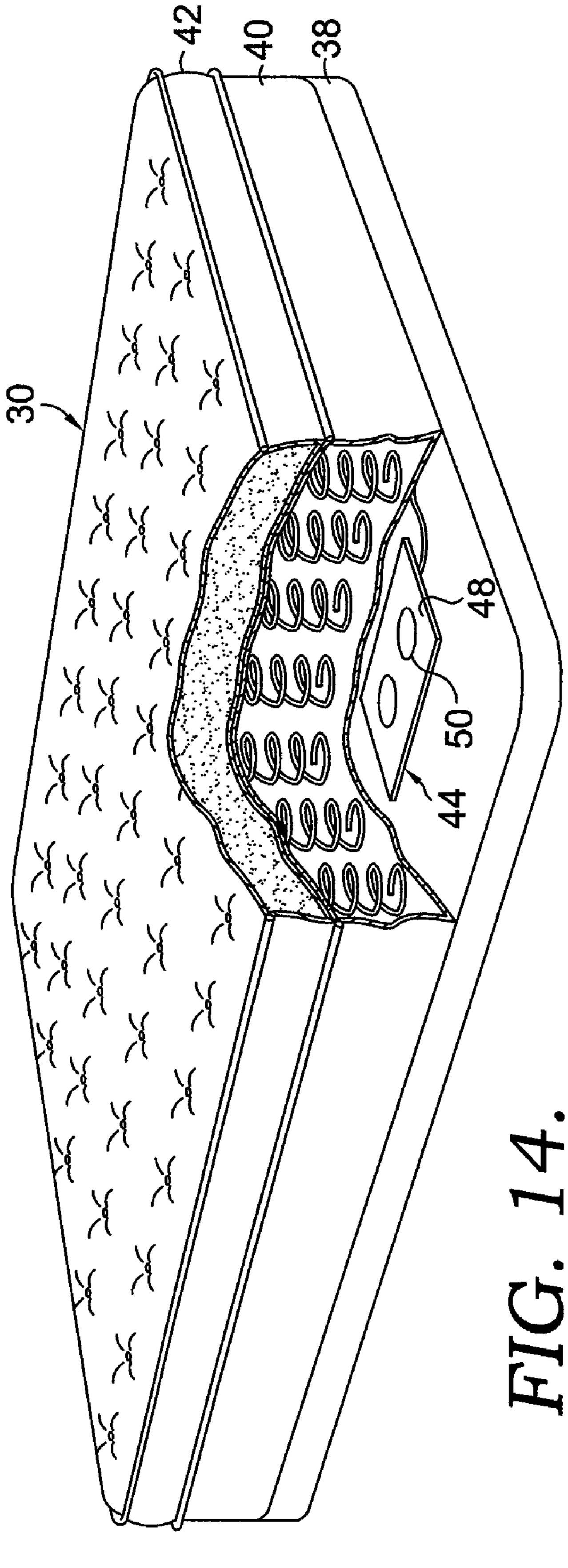
FIG. 14 is a view of the mattress assembly and sensor unit with parts broken away to show details of construction.

Each bed unit 30 is also provided with a sensor unit 44 (FIG. 14). The sensor unit 44 is located between the first layer 38 and the innerspring mattress 40 in the general area of the torso region of a person laying on the bed. The sensor unit 44 is preferably mounted to the first layer 38 using rubber standoffs at each corner of the sensor unit. The sensor unit 44 uses piezo-electric strain gauges 50 that are about 30 mm in diameter. The sensors can be purchased, for example, from Atlas Researches, Ltd, of Hod Hasharon, Israel. The sensors are coupled to a semi-rigid substrate 48 that is approximately ⅛" thick. For example, the substrate could be a piece of Plexiglas. The sensors are sensitive and can detect very small deflections of the sensors as voltage differences, which are magnified by the Plexiglas plate 48. This creates a voltage that is amplified by an inline electronic amplifier. The sensing units 44 may also be provided with a load cell that detects the presence of a person in the bed. It should be understood that other placement and configuration of the sensors could also be used, so long as the sensors are able to detect the conditions described below. The placement of the sensor unit allows for body exertions (respiration, pulse, motion, and presence) to cause the semi-rigid plate (and thus the piezo-electric strain gauge) to distress, and produce a voltage. The output of the sensor 44 is paralleled into a series of analog Low-Pass and Band-Pass filters, each with unique electronic gain characteristics. The purpose of the independent filter and gain stages is to isolate different user actions at different frequencies, and amplitudes. For example: An adult heartbeat averages 1.17 Hz (70 beats per minute), a typical respiration frequency for adults is up to 0.25 Hz (15 breaths per minute), and produces an exponential increase in distress to the strain gauge 50. One channel can be used to "listen" for frequencies below 0.5 Hz (Breathing) with a low-level electrical gain. Another channel can be "listening" for frequencies between 0.5 Hz to 2 Hz (Heartbeat) with a much higher electrical gain built into the circuit. The end effect is that both signals will be fed into the a microprocessor at the same amplitude, and makes the signal processing easier to handle. This same concept is applied across each of the signals or user actions described below.

Along with the sensor unit 44, each bed is also preferably provided with a microphone (not shown). The microphone is preferably a standard electret microphone, 100 Hz high pass and 400 Hz low pass, first order filtering, full-wave rectified and averaged with a 200 msec low pass time constant sampled at 50 samples per second. It should be understood that other microphones could be used as well.

The signals from the sensor units 44 and the microphones are used to detect the respiration, motion, pulse and snoring of a person laying on the bed unit 30. The signal is filtered using active filtering through operational amplifiers, precision resistors, capacitors and inductors. These components are arranged to create low-pass filters, high-pass filters, and/or band-pass filters. Using this filtering, the single signal coming from the sensor unit 44 can be divided into separate channels. A separate channel can be filtered from the signal for each of the respiration, motion, pulse and snoring conditions of the user. Each condition has an electronic signature and the filtering is used to separate and identify the specific signature. If the microphone is used, the snoring condition is detected by the microphone. Each of the bed units 30 is provided with the above detection assembly. To provide separate data for each bed unit, the bed units are isolated from one another. Further use of the signaling from these sensors is described in more detail below.

Figure 3:
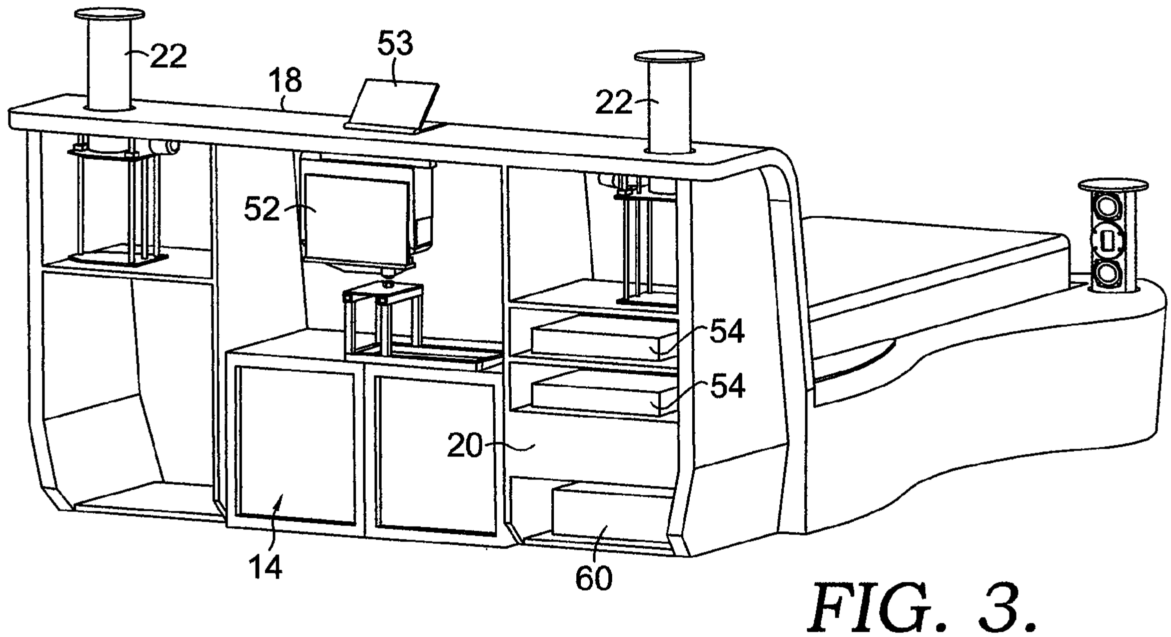
FIG. 3 shows the rear cavity behind the headboard and the speakers extended.

As best seen in FIGS. 3 and 6, the bed 10 also has a video projection unit 52 mounted within the headboard 18. Alternatively, the projection unit 52 could be mounted at the foot of the bed 10. The projection unit 52 is preferably capable of projecting high-definition signals, such as the 1080i or 1080p resolution projectors that are available. In a further embodiment, the projection unit can be replaced by a standard television display, preferably a high-definition display such as an LCD or plasma display device. The projector is preferably mounted in a vertical orientation within headboard 18, with the projector pointed upwardly. The vertical orientation allows the headboard 18 to be of a more shallow construction. To project the images forwardly, a mirror 53 is used to redirect the projection, such as to a screen or wall directly in front of the bed 10 (see FIG. 6). In a preferred embodiment, the video projector and mirror are constructed to allow a change in the projection destination from a location either directly in front of the bed 10, or directly above the bed 10. This construction allows a user of the bed to view the projection from a more upright position by projecting the image in front of the bed, or from a more prone position by projecting the image above the bed. The change in projection is achieved by repositioning the mirror and refocusing the image based on the distance to the projecting surface. If the projection is to be directly above the projection unit, the mirror may not be necessary. The video projection unit 52 operates in conjunction with a number of audio components 54 held within the support racks 20. The audio components will typically include at least an audio receiver, but can also include other components such as amplifiers, surge protectors, etc.

To compensate for the image bias built into a standard projector, the projection unit 52 is rotated about a vertical axis. The bias built into the standard projector is to compensate for projecting upwards, for a projector setting on a conference table or downwards for a projector located in the ceiling. The bias includes projecting an image in the keystone shape such that the image will be square upon the projection surface. Since the bias needed to generate a square image on the ceiling is different from a wall, the projector needs to be rotated 180 degrees about the vertical axis to switch. So a standard video projector can be used. The rotation of the projector causes the projector to automatically reverse the image. To compensate for the reversal of the image, caused by the rotation of the projector, the image projected by the projector needs to be electronically reversed prior to projection, which is a known reversal process to those of skill in the art.

The bed 10 is controlled through a computing device 60, which can also be located within the headboard 18 and specifically on the support racks 20. The computing device can be a robust personal computer, or a thin-client computer coupled to a more robust computer at another location. As an example, and without limitation, the computing device 60 can be a thin-client computer coupled over a personal network to a more powerful server type computer located elsewhere within the home. The computing device 60 is used to control the bed 10, to process the signals received from the sensing units 44 and microphone, and to provide the media experience in connection with the audio and video components described above. Therefore, the signals from the sensing units 44 and microphone are passed to the computing device 60 after filtering. The use of this data is further described below.

In addition to the sensing devices and microphones, the other components of the bed 10 are also coupled to the computing device 60. The audio and video components are therefore coupled to the computing device 60, as are the motors used to control the orientation of each bedding unit 30. Similarly, the control unit of each cooling pad 36 is coupled to the computing device 60. Other environmental room appliances are also preferably coupled to the computing device 60. These environmental room appliances are typically web services devices (WSD) and can include, for example, such things as alarm clocks, automatic window shades, room lighting, home security cameras, thermostats and phones. It should be understood that other electronic devices could also be coupled to the computing device 60, as will be better understood from the use scenarios described below.

Preferably, the computing device 60 is a media personal computer equipped to provide storage and retrieval of videos, music and images. The computing device 60 is also preferably equipped to receive cable or satellite television signals. Any of a number of computing devices 60 available today and running a media operating system such as the Windows Media Center® software available from the Microsoft Corporation of Redmond, Wash. are acceptable. Such an operating system utilizes a user interface that is remote friendly, and operable at a distance without the use of a keyboard. In the preferred embodiment, the user interface is operable using a radio-frequency (RF) remote. The software provides easy access to, for example, stored video, cable or satellite signals, stored images, and stored audio files. Using the computing device 60, and software modified to accommodate control of the bed positions, media and room conditions can be controlled using a single RF remote.

Figure 8:
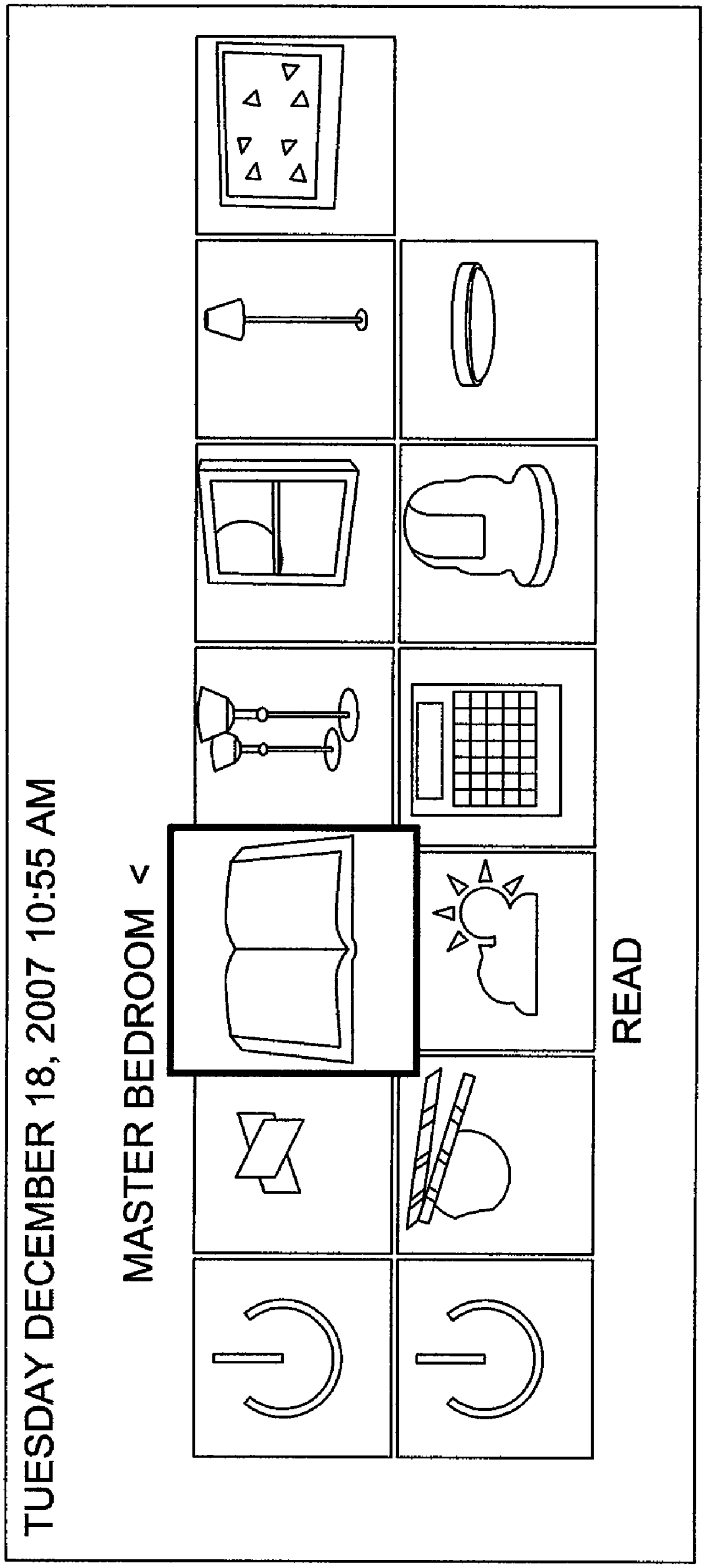
FIG. 8 is a view of one representative user interface for use with the bed.

The computing device 60 is programmed to include a selectable icon to control settings for the bed 10 and the environment for the bed. The settings, for example, can be accessed through a "My Bed" icon programmed into the software. Using the software, preprogrammed settings can be provided to users. These settings are virtually limitless. An entry user interface can be displayed, such as that shown in FIG. 8. From this user interface, the remote can be used to indicate the user wishes to watch TV, lay flat, or read, for example. Upon selection of one of these options, the bed and room environment change using only one selectable control. As shown in FIG. 8, other selectable options could include controlling, without limitation, lighting, audio visual equipment, window blinds or security systems.

For example, a "Reading" setting can be programmed into the software. When the "Reading" setting is activated, the computing device 60 can be programmed to adjust the bed 10 and the room environment. This could include raising the head of the bedding unit 30 on the appropriate side (i.e. the appropriate one of the bedding units 30), turning on the lights to accommodate reading, adjusting the temperature of the bed if desired, and turning down/off the volume of any audio currently playing. Other settings are also preferably provided, and can include a "Sleep" setting, where the bed is adjusted to a flat position, the lights are turned off as is any currently playing audio and/or video. A "Video" or "TV" setting can also be programmed into the computing device 60. In such a setting, the user may be provided an option of a forward projection or upward projection of the image. The bed and projection will be adjusted accordingly. For example, if the user desires a forward projection, the image is projected forwardly and the bed is adjusted so that the person in the bed is in more of a seated position, looking forwardly. In addition, the computing device 60 will extend the audio speakers 22 and 24 with the "Video" or "TV" setting activated. Anytime a setting is selected requiring audio, the speakers are extended. The speakers 22 and 24 are retracted when a setting is selected, such as "Sleep" where audio is not desired.

Figure 10:
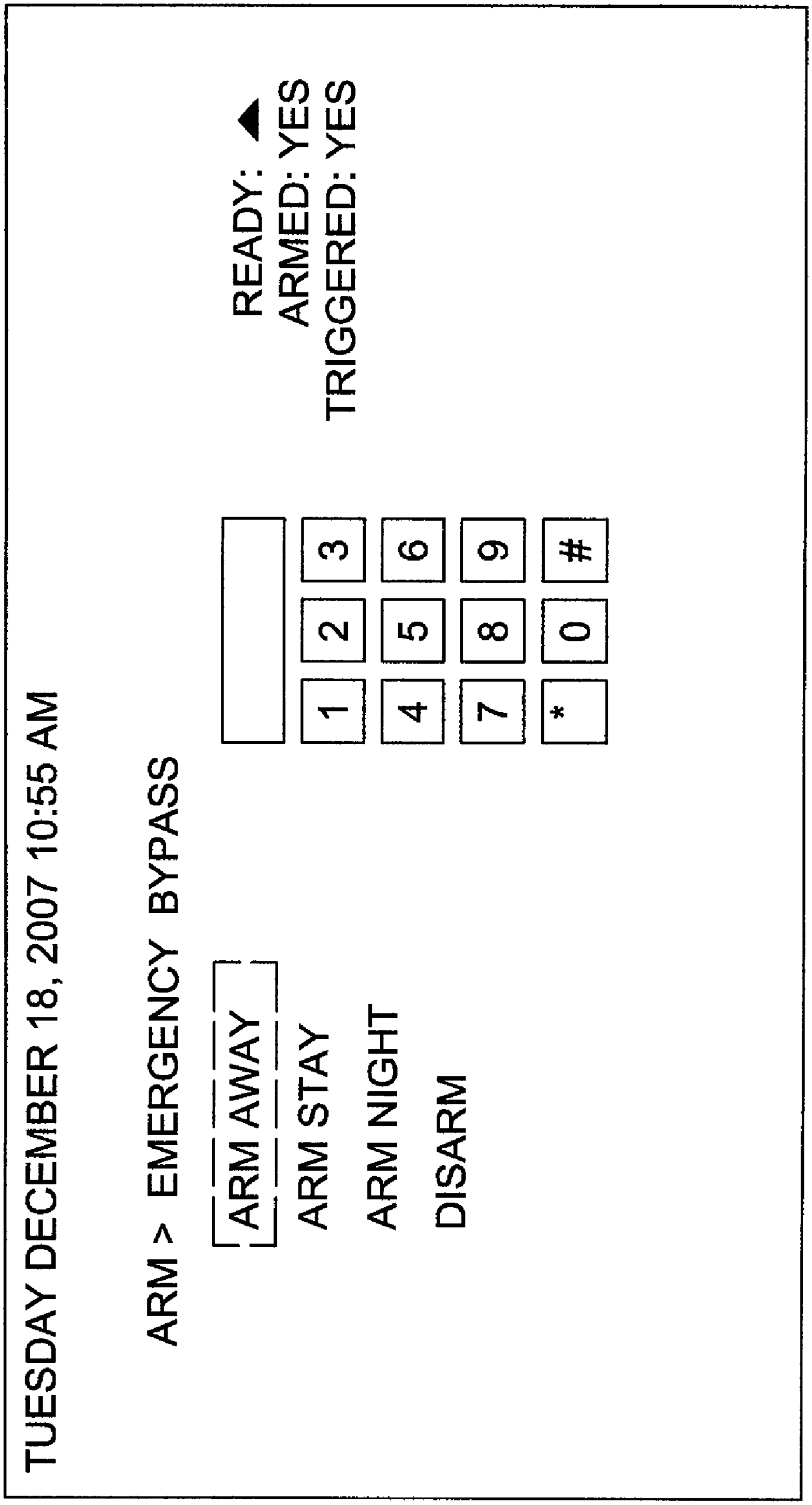
FIG. 10 is a view of a security system user interface for use with the bed.

FIG. 9 shows a user interface screen accessible to change the temperature settings of the cooling pad 36. FIG. 10 shows a user interface accessible to activate or otherwise change the security system of the home. This could also be tied to a security camera or other device.

Preferably, all of the bedding controls and room environment controls are also individually accessible through the distance user interface of the computing device 60. Using a remote, a user of the bed can therefore individually control the position of the bed, as well as the temperature and other operational aspects of the bed 10, such as the massage feature. The user can also individually control the available media. This allows a user to turn on the TV or video available, for example, without adjusting the bed or other room conditions.

Diagnostic Monitoring

As described above, the bed 10 is able to detect a person's pulse, respiration, major movements and snoring using the sensing units 44 and the microphone. The signals from the sensing unit 44 and microphone are delivered to the computing device 60. The computing device 60 records this diagnostic information about the person. The diagnostic measurements can be initiated by the user or can be set to begin measurement at a certain time, or whenever the system determines the user is in the bed. For example, the system can determine a person is in the bed when pulse and respiration are detected for a certain length of time, or by using the load cell to detect presence. The system can then begin recording data for the sleep session of the user.

Figure 11:
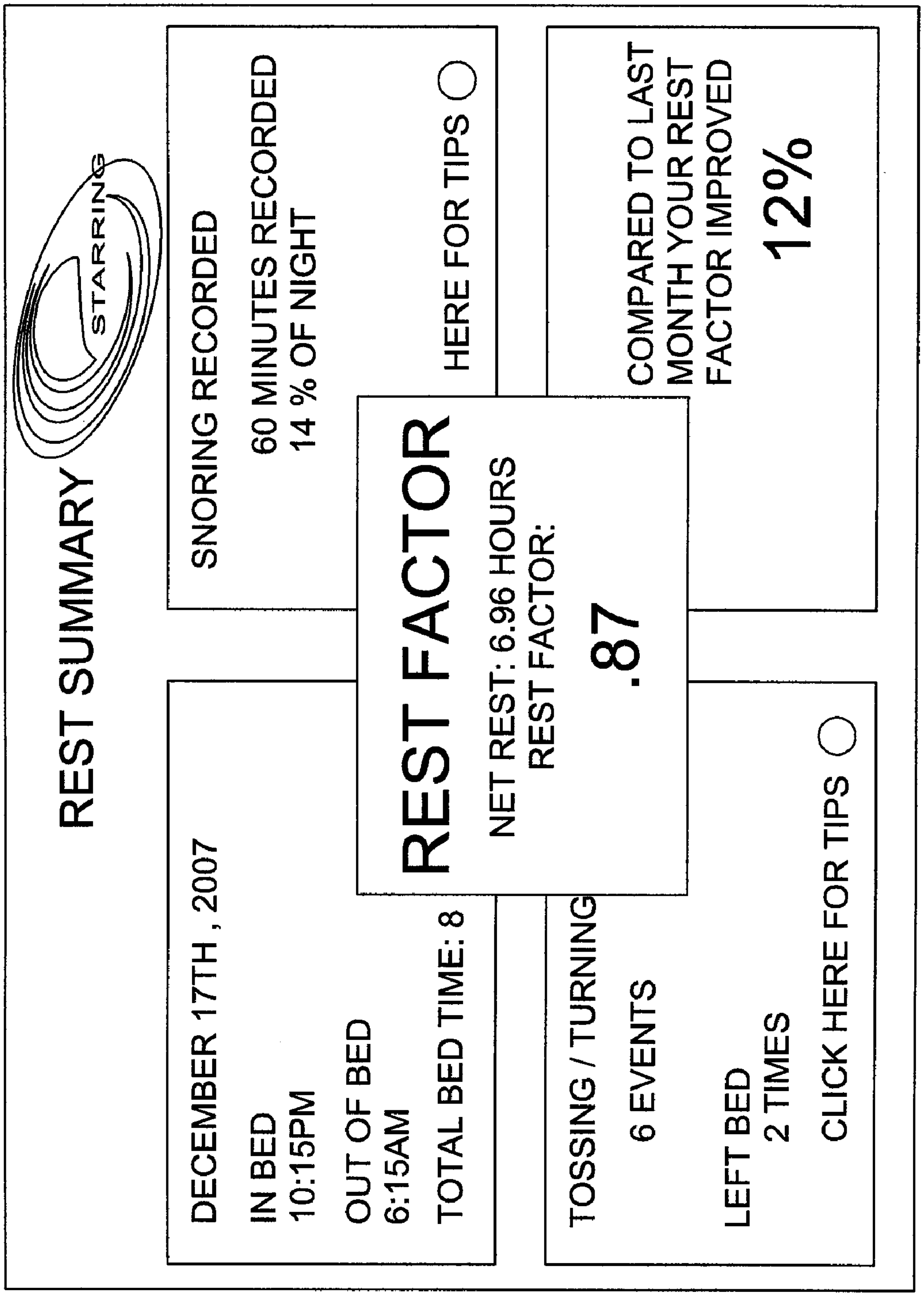
FIG. 11 is a view of a rest summary user interface illustrating data obtained by the bed.
Figure 12:
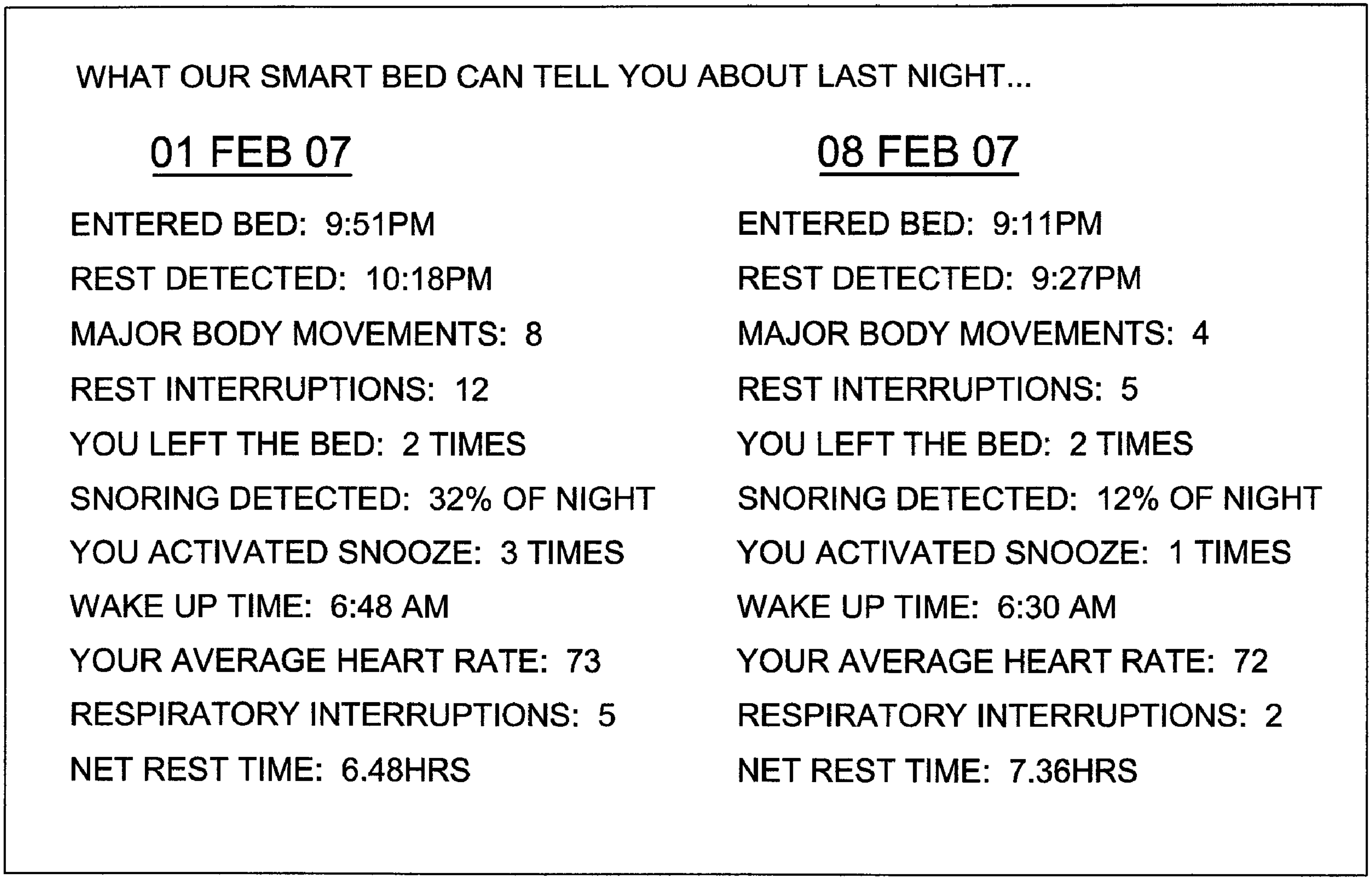
FIG. 12 is a view of a comparison screen shot comparing two different nights' rest.
Figure 13:
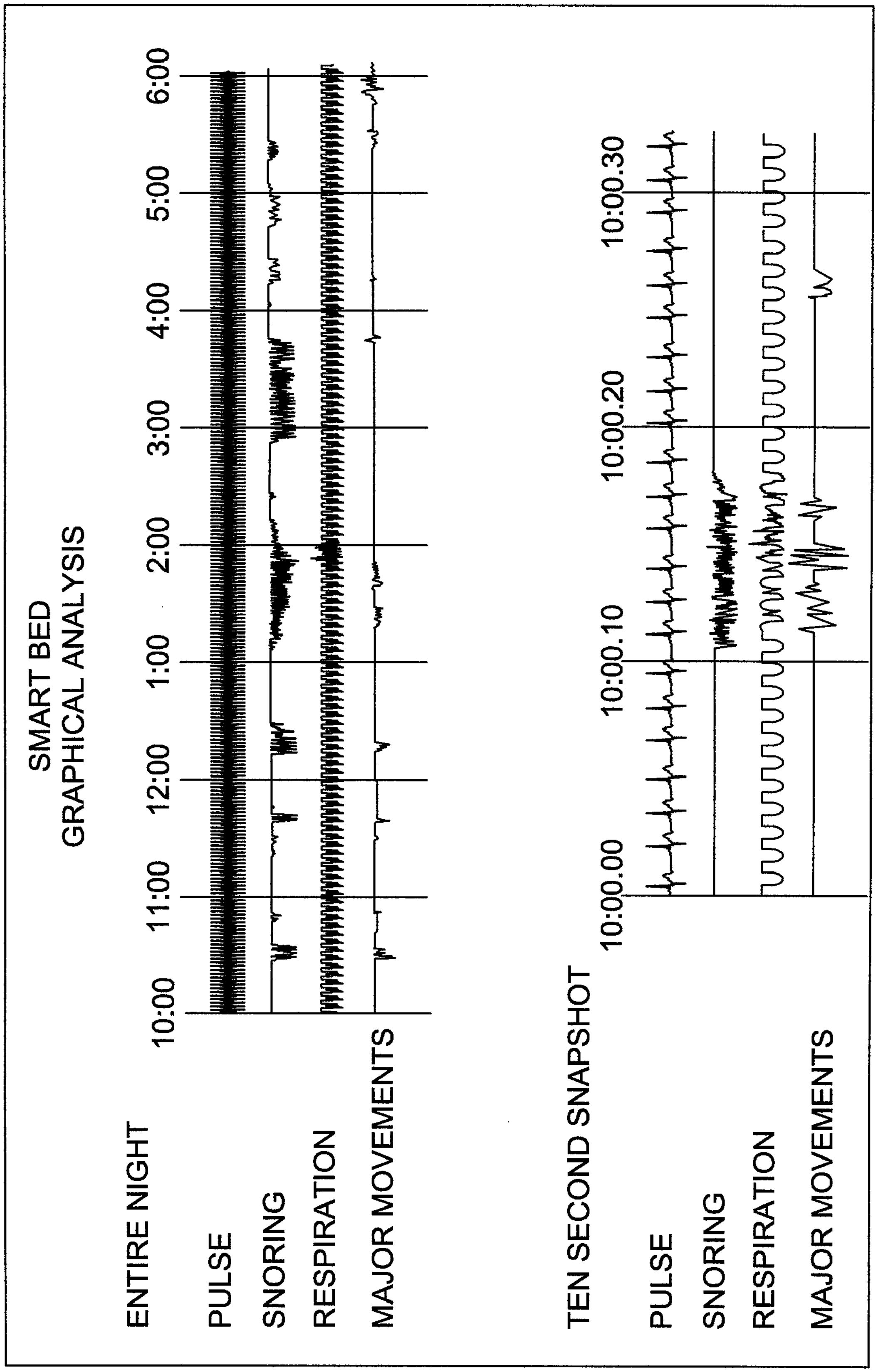
FIG. 13 is a view of a graphical analysis screen shot showing data obtained by the bed.

The bed 10 can therefore provide data regarding the quality of sleep achieved during any sleep session. The sensing units 44 provide data to the computing device 60 which can then record and deliver the data to an interested person. For example, the computing device 60 can provide the data to the user of the bed, and can compare data from different time periods. FIGS. 11-13 illustrate examples of data provided through the computing device 60. As shown, the system can determine when a user enters the bed, and when rest is detected. Detected rest can be determined when the sensing units stop detecting major movements and/or when respiration and pulse are steady and slower than when the person first entered the bed. Additionally, a delay can be programmed to allow the person to get in the bed and situated before any monitoring and programmed reaction begins. Data can also be provided regarding the number of major body movements detected during the sleep session, the number of rest interruptions, the number of times the person left the bed, the amount of snoring detected during the sleep session, whether the person activated a snooze feature of the alarm clock and the time the user woke up and left the bed. In addition, the system can provide data regarding the person's average heart rate, the number of respiratory interruptions and the net rest time of the person. This data can then be compared over time, such as day-to-day, week-to-week or month-to-month.

The bed 10, using the computing device 60, can be used to provide the sleep data to the user in the morning to provide a quick "sleep summary" to the user. This can be provided through the display using the video projector 52, or can be delivered through the network to any of a number of devices.

For example, the summary data can be provided to the user's cell phone, personal digital assistant or to another computer, such as the user's work computer though an available network, such as the Internet, a LAN or WAN. Moreover, should the user desire and authorize such activity, the data could be sent to another person, such as the user's physician.

In addition to the sleep summary data show in FIG. 11, the data can be provided in a graphical format, such as that shown in FIG. 13. If the user desires, an additional "snapshot" can be shown, such as that shown in the lower portion of FIG. 13. This snapshot provides an expanded view of the graphical data in a more limited time frame. In addition to the summary data, a real time display of the data being gathered can be seen on the user interface, if the user so desires.

The data can be used to calculate the quality of the sleep achieved during any sleep session. This calculation can factor in the total time a person is in bed, the number of major movements during the sleep session, the number of times a user left the bed, any respiratory interruptions and any snoring activity. Basically, all or part of the data collected during a sleep session can be used to calculate the quality of sleep, or "rest factor" for any given sleep session. This rest factor can then be compared from previously calculated rest factors to indicate whether the sleep quality achieved is improving or deteriorating. Adjustments can be made to the sleeping environment, the person's lifestyle (such as diet and exercise) and such things as medication. The effectiveness of these adjustments can then be determined by comparing the before and after rest factors.

For example, and without limitation, assume the sensing unit determines a person enters bed at 10:15 pm, and gets out of bed in the morning at 6:15 am (see FIG. 11). The person was in bed for a total of eight hours. Also assume that the sensing units determined that the person left the bed two times during the evening, and each time they left the bed they were gone for two minutes. The calculation can assume that each of these events resulted in a loss of ten minutes of sleep. So the two leaving events total twenty minutes in this example. The system may also determine that the person snored for a total of 60 minutes during the sleep session, using either the sensing units and/or the microphone. One implementation assumes that snoring reduces the rest by about 50 percent, so the snoring time results in 30 minutes of lost rest during the session. Also assume that the sensing units detect six major movements during the sleep session (such as tossing and turning). One implementation of the calculation assumes that each event causes the person to lose two minutes of rest. So in this example, the major movements cause the person to lose a total of 12 minutes of rest. Using the above measurements, the person was in bed for a total of eight hours, or 480 minutes. Of that 480 minutes, the person lost twenty minutes of rest by leaving the bed, thirty minutes of rest snoring and twelve minutes of rest tossing and turning, for a total of sixty-two minutes of lost rest. A rest factor can be calculated by dividing the total sleep minutes by the lost sleep minutes and subtracting that number from 1, or 1−(62/480)=0.87. It should be understood that other algorithms could be used to calculate a rest factor. Specifically, other measurements can be included, such as any respiratory interruptions, and other assumptions about the loss of rest can be applied. For example, the quality of rest during snoring can be adjusted, as can the loss of rest as a result of leaving the bed. The example above is merely one example of a possible calculation of the quality of rest achieved by a person using the measurements of the sensing unit 44 and microphone. As stated above, the calculated rest factor can then be used to indicate the quality of sleep as compared to a person's average rest factor, or to a specific rest factor.

Another exemplary formula for indicating the quality of sleep obtained by a person, or rest factor, is represented by the formula:

$$\text{Rest Factor}=(A*\text{SnoreFactor}+B*\text{ApneaFactor}+C*\text{MovementFactor}+D*\text{ExitFactor}+E*\text{SleepFactor})/(A+B+C+D+E).$$

In this calculation;

SnoreFactor=100−0.5*Number of Snore Events;

ApneaFactor=100−5.0*Number of Apnea Events;

MovementFactor=100−0.5*Number of Movement Events;

ExitFactor=100−5.0*Number of Exit Events; and

SleepFactor=100−|8—Number of hours in bed|.

Each of A, B, C, D and E are constants. In the currently preferred embodiment, the constants are each equal to one. But, each of the constants could be a different number. It should of course be understood that the formula and examples above are only examples, and that other formulas could be used, with different weights given to different factors. It should also be understood that the formula and examples above are only examples, and that other formulas could be used, with different weights given to different factors.

Using this rest factor formula, the quality of sleep during the night can be calculated and presented to the user, as shown in exemplary FIG. 11.

Also, as stated above, the diagnostic monitoring can be specifically activated by the user through the user interface, or the monitoring can be triggered by another event, such as a user entering the bed, a specific time, or a diagnostic event, such as snoring.

In addition to calculating the quality of rest, the signals generated by the sensing units 44 and microphones can be used as triggers to affect the sleeping environment of the person. As one example, if the sensing units 44 and or the microphones detect a snoring event, the head of the bedding unit 30 on which the person is sleeping can be raised slightly and controlled by the computing device 60. As an example, the head of the bed could be raised by seven degrees. The system continues to monitor for snoring, and if the snoring continues, the head of the bed can be raised further. This monitoring and raising can be programmed to occur automatically and can continue up to some predetermined maximum raised position, such as thirty five degrees. Once the snoring has stopped for a set period of time, such as five minutes, the bed 10 can react by lowering the head of the bed to the horizontal, standard, sleeping position. It should be understood that amount of each head raise, and the length of time between each raise, can be customized to best accommodate each individual user, although it is preferable to set the system with a standard default response system.

Other detected events can also be used as change triggers. Any respiratory interruptions, such as those common in people suffering from sleep apnea, can be used as a trigger to provide an appropriate response. Should a respiratory interruption occur, the head of the bed could be raised, or the massage units activated, or some other responsive action in an attempt to halt the respiratory interruption. As another example, should the sensing units 44 detect the user leaving the bed, the computing device 60 can communicate with the coupled WSDs to assist the person in some way. More specifically, if the sensing units 44 detect the user leaving the bed, the computing device can adjust the lighting, such as by illuminating a path to the restroom.

The bed 10 can also be programmed to automatically change the bed orientation, condition and room environment as a function of events or conditions. As an example, and without limitation, the cooling pad 36 can be programmed to adjust the temperature of the bedding unit 30 as a function of time, either making the bed cooler or warmer as the sleep session progresses. Additionally, the cooling pad 36 can be coupled to the computing device 60 and can be controlled to automatically adjust the temperature of the cooling pad as changes in temperature of the bed environment are detected. In this example, a temperature sensing device is included and is used to provide feedback to the computing device 60. If the temperature of the sleeping environment increases above a predetermined point, the cooling pad 36 is activated to lower the temperature. Similarly, if the temperature of the sleeping environment drops below a predetermined point, the pad 36 is activated to raise the temperature.

Using the computing device 60 coupled to the bed 10 also provides opportunities for different waking experiences. For example, the computing device 60 can be programmed to turn on the television at a certain time and/or to wake the person with a gentle massage. The user could also wake to a screen providing the sleep summary data.

All of the monitoring and responsive actions described above can be customized by the user of the bed. Additionally, the user can adjust or turn off any of the monitoring as desired, or can adjust the sensitivity of the system. This allows users to activate any responsive actions only upon more severe snoring events, for example.

Having thus described the invention, what is claimed is:

1. An apparatus for providing a user the ability to control a bedroom environment using one selectable control, the apparatus comprising:

- an adjustable bedding unit coupled to a frame, the frame defining at least one cavity;
- a computing unit coupled to the adjustable bedding unit;
- at least one audio speaker retractably coupled to the frame, the speaker being extendable from and retractable into the cavity defined by the frame, the speaker being electrically coupled to the computing unit and capable of being controlled by the computing unit, such that the computing unit can be used to effectuate extension and retraction of the speaker;
- a plurality of controllable electronic appliances, having an effect on the bedroom environment, that are electrically coupled to the computing unit and capable of being controlled by the computing unit; and
- a user interface control unit coupled to the computing unit, the user interface presenting the user with a plurality of user-selectable settings that cause an adjustment in the position of the adjustable bed, the extension or retraction of the at least one speaker, and an adjustment in at least one of the electronic appliances.

2. The apparatus of claim 1, further comprising at least one motor coupled to the adjustable bedding unit and the computing unit, and wherein a first user-selectable setting includes a first predetermined adjustable bed position that upon selection causes the computing unit to control the motors to moved the adjustable bedding unit to the first predetermined position.

3. The apparatus of claim 2, wherein the first predetermined adjustable bed position is associated with a first predetermined setting for a first of the electronic appliances, and such that selection of the first user-selectable setting causes the computing unit to adjust the first electronic appliance and the adjustable bedding unit to the first predetermined settings for each.

4. The apparatus of claim 3, wherein the first predetermined adjustable bed position is associated with a second predetermined setting for a second of the electronic appliances, and such that selection of the first user-selectable setting causes the computing unit to adjust the first and second electronic appliances and the adjustable bedding unit to the first predetermined setting for the adjustable bed and the first predetermined setting for the first electronic appliance and the second predetermined setting for the second electronic appliance.

5. The apparatus of claim 4, wherein the first user-selectable setting moves the bed to a position amenable to reading, with the first predetermined adjustable bed position being a flat bed position, wherein the first electronic appliance is a light and the first predetermined setting for the first electronic appliance causes the computing unit to instruct the light to turn off, and wherein the second electronic appliance is an audio/video device and the second predetermined setting for the second electronic appliance causes the computing unit to instruct the audio/video device to turn off.

6. The apparatus of claim 4, wherein the first user-selectable setting moves the bed to a position amenable to sleeping, with the first predetermined adjustable bed position having a raised head end of the bed, wherein the first electronic appliance is a light and the first predetermined setting for the first electronic appliance causes the computing unit to instruct the light to turn on, and wherein the second electronic appliance is an audio/video device and the second predetermined setting for the second electronic appliance causes the computing unit to instruct the audio/video device to turn off.

7. The apparatus of claim 4, wherein the first user-selectable setting moves the bed to a position amenable to watching television, with the first predetermined adjustable bed position having a raised head end of the bed, wherein the first electronic appliance is a light and the first predetermined setting for the first electronic appliance causes the computing unit to instruct the light to turn off, and wherein the second electronic appliance is an audio/video device and the second predetermined setting for the second electronic appliance causes the computing unit to instruct the audio/video device to turn on.

8. The apparatus of claim 4, wherein the first user-selectable setting moves the bed to a position amenable to watching television, with the first predetermined adjustable bed position having a raised head end of the bed, wherein the first electronic appliance is a light and the first predetermined setting for the first electronic appliance causes the computing unit to instruct the light to dim, and wherein the second electronic appliance is an audio/video device and the second predetermined setting for the second electronic appliance causes the computing unit to instruct the audio/video device to turn on.

9. The apparatus of claim 1, wherein the user interface control unit is a hand-held device presenting graphical icons representing the user-selectable settings.

10. An adjustable bed comprising:

- an adjustable bedding unit coupled to a frame having a headboard;
- a computing unit coupled to the adjustable bedding unit;
- at least one audio speaker supported by the headboard of the frame, the audio speaker being mounted such that it can extend from and retract into the headboard, the audio speaker being coupled to the computing unit and being capable of being extended and retracted as controlled by the computing unit;
- a plurality of controllable electronic appliances, having an effect on the bedroom environment, that are electrically coupled to the computing unit and capable of being controlled by the computing unit; and a user interface control unit coupled to the computing unit, the user interface presenting the user with a plurality of user-selectable settings that cause an adjustment in the position of the adjustable bed, a change in the position of the audio speaker to extend or retract the speaker, and a change in at least one of the electronic appliances.

11. The adjustable bed of claim 10, further comprising a video projection unit mounted within the headboard.

12. The adjustable bed of claim 11, further comprising a mirror that redirects a projection of an image by the video projector.

13. The adjustable bed of claim 10, further comprising at least one motor coupled to the adjustable bedding unit and the computing unit, and wherein a first user-selectable setting includes a first predetermined adjustable bed position that upon selection causes the computing unit to control the motors to moved the adjustable bedding unit to the first predetermined position.

14. The adjustable bed of claim 13, wherein the first predetermined adjustable bed position is associated with a first predetermined setting for a first of the electronic appliances, and such that selection of the first user-selectable setting causes the computing unit to adjust the first electronic appliance and the adjustable bedding unit to the first predetermined settings for each.

15. An apparatus for providing a user the ability to control a bedroom environment using one selectable control, the apparatus comprising:

an adjustable bedding unit coupled to a frame having a headboard, wherein the frame supports at least one audio speaker that can be retracted into a cavity defined by the frame;

a computing unit coupled to the adjustable bedding unit;

a video projection unit mounted within the headboard;

a plurality of controllable electronic appliances, having an effect on the bedroom environment, that are electrically coupled to the computing unit and capable of being controlled by the computing unit; and a user interface control unit coupled to the computing unit, the user interface presenting the user with a plurality of user-selectable settings that cause an adjustment in the position of the adjustable bed, the retracted position of the speaker, the video projection unit, and at least one of the electronic appliances.

16. The apparatus of claim 15, further comprising a mirror that redirects a projection of an image by the video projector.

17. The apparatus of claim 15, further comprising a sub-woofer disposed in an under cavity, the under cavity being defined by the frame, wherein the sub-woofer points toward the headboard.

18. The apparatus of claim 15, wherein the computing unit is a thin-client computer communicatively coupled, via a personal network, to a remote computer.

19. The apparatus of claim 15, further comprising at least one motor coupled to the adjustable bedding unit and the computing unit, and wherein a first user-selectable setting includes a first predetermined adjustable bed position that upon selection causes the computing unit to control the motors to moved the adjustable bedding unit to the first predetermined position.

20. The apparatus of claim 19, wherein the first predetermined adjustable bed position is associated with a first predetermined setting for a first of the electronic appliances, and such that selection of the first user-selectable setting causes the computing unit to adjust the first electronic appliance and the adjustable bedding unit to the first predetermined settings for each.

* * * * *